United States Patent [19]

Miller

[11] 4,393,158

[45] Jul. 12, 1983

[54] HYDROLYTICALLY STABLE POLYCARBONATE COMPOSITIONS

[75] Inventor: Kenneth F. Miller, Mt. Vernon, Ind.

[73] Assignee: General Electric Company, Mt. Vernon, Ind.

[21] Appl. No.: 284,639

[22] Filed: Jul. 20, 1981

[51] Int. Cl.$^3$ .............................................. C08L 69/00
[52] U.S. Cl. .................................... 524/114; 524/265; 525/463; 525/464
[58] Field of Search .................. 260/45.8 A; 525/463, 525/464; 524/265, 114

[56] References Cited

U.S. PATENT DOCUMENTS

| | | | |
|---|---|---|---|
| 4,197,384 | 4/1980 | Bialous et al. | 525/464 |
| 4,243,779 | 1/1981 | McAlister | 525/464 |
| 4,335,038 | 6/1982 | Thomas | 524/265 |

FOREIGN PATENT DOCUMENTS 55-89374  7/1980  Japan .................................. 524/265

*Primary Examiner*—Wilbert J. Briggs, Sr.
*Attorney, Agent, or Firm*—Martin B. Barancik

[57] ABSTRACT

An improved hydrolytically stable aromatic polycarbonate composition comprising in admixture an aromatic polycarbonate resin and a stabilizing amount of at least one stabilizing compound selected from epoxy silanes and epoxy siloxanes.

12 Claims, No Drawings

HYDROLYTICALLY STABLE POLYCARBONATE COMPOSITIONS

BACKGROUND OF THE INVENTION

One of the significant problems associated with the use of polycarbonate resins, particularly in high temperature environments, is the tendency of polycarbonates to undergo hydrolytic degradation. It is known in the prior art to add certain additives to polycarbonate which provide compositions exhibiting increased resistance to hydrolytic degradation. Examples of such additives are found in U.S. Pat. Nos. 3,839,247; 4,076,686; and 4,138,379. These additives are in general very useful and have extended the uses of aromatic polycarbonates into areas requiring increased levels of hydrolytic stability. However, certain properties of the aromatic polycarbonates can be detrimentally affected by the addition of these additives. The presence of the additive can bring about a haze in the polycarbonate article or detrimentally affect the color of the polycarbonate article. There thus exists a need for a polycarbonate composition which exhibits improved hydrolytic stability while at the same time retaining all of the advantageous physical properties of unmodified polycarbonate. It is an object of the instant invention to provide such a polycarbonate composition.

SUMMARY OF THE INVENTION

In accordance with the present invention there are provided novel aromatic polycarbonate compositions which exhibit improved resistance to hydrolytic degradation comprising in admixture an aromatic polycarbonate resin and a stabilizing amount of at least one hydrolytic stabilizer selected from epoxy silanes, epoxy siloxanes, and mixtures thereof.

DESCRIPTION OF THE INVENTION

It has now been found that polycarbonate resin compositions can be obtained whose physical properties, including improved hydrolytic stability, permit them to be used in a broader range of applications than was previously possible. This is accomplished by admixing with the polycarbonate resin a hydrolytically stabilizing amount of a compound selected from the epoxy silanes, epoxy siloxanes, or mixtures thereof. These stabilized compositions can be used in higher temperature environments than heretofore available polycarbonate resin compositions.

The carbonate polymers employed in the practice of the instant invention are well known in the art and are described, for example, in U.S. Pat. Nos. 3,028,365; 3,334,154; 3,275,601 and 3,915,926, all of which are incorporated herein by reference. These aromatic carbonate polymers may be carbonate homopolymers of dihydric phenols, carbonate copolymers of two different dihydric phenols or copolymers of such dihydric phenols with glycols, e.g., ethylene glycol or propylene glycol. Generally, such aromatic carbonate polymers are prepared by reacting a dihydric phenol with a carbonate precursor. The dihydric phenols employed in the practice of the instant invention are known dihydric phenols in which the reactive groups are the two phenolic hydroxyl groups. Some useful dihydric phenols are represented by the general formula

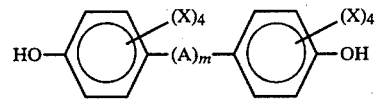

wherein A is a divalent hydrocarbon radical containing from 1 to about 15 carbon atoms; a substituted divalent hydrocarbon radical containing from 1 to about 15 carbon atoms and substituent groups such as halogen; —S—; —S—S—;

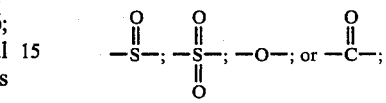

wherein each X is independently selected from the group consisting of hydrogen, halogen, and a monovalent hydrocarbon radical such as an alkyl radical of from 1 to about 8 carbon atoms, an aryl radical of from 6 to about 18 carbon atoms, an aralkyl radical of from 7 to about 18 carbon atoms, an alkaryl radical of from 7 to about 18 carbon atoms, an oxyalkyl radical of from 1 to about 14 carbon atoms, or an oxyaryl radical of from 6 to about 18 carbon atoms; and wherein m is zero or one.

Typical of some of the dihydric phenols that can be used in the practice of the present invention are bisphenols such as bis(4-hydroxyphenyl)methane, 2,2-bis(4-hydroxyphenyl)propane (also known as bisphenol A), 2,2-bis(4-hydroxy-3-methylphenyl)propane, 4,4-bis(4-hydroxyphenyl)heptane, 2,2-bis(4-hydroxy-3,5-dichlorophenyl)propane, 2,2-bis(4-hydroxy-3,5-dibromophenyl)propane, etc.; dihydric phenol ethers such as bis(4-hydroxyphenyl)ether, bis(3,5-dichloro-4-hydroxyphenyl)ether, etc.; dihydroxydiphenyls such as p,p'-dihydroxydiphenyl, 3,3'-dichloro-4,4'-dihydroxydiphenyl, etc.; dihydroxyaryl sulfones such as bis(4-hydroxyphenyl)sulfone, bis(3,5-dimethyl-4-hydroxyphenyl)sulfone, etc.; dihydroxy benzenes, resorcinol, hydroquinone, halo- and alkyl- substituted dihydroxy benzenes such as 1,4-dihydroxy-2,5-dichlorobenzene, 1,4-dihydroxy-3-methylbenzene, etc.; and dihydroxy diphenyl sulfides and sulfoxides such as bis(4-hydroxyphenyl)sulfide and bis(4-hydroxyphenyl)sulfoxide, bis(3,5-dibromo-4-hydroxyphenyl)sulfoxide, etc. A variety of additional dihydric phenols are also available and are disclosed in U.S. Pat. Nos. 2,999,835; 3,028,365 and 3,153,008, all of which are incorporated herein by reference. It is, of course, possible to employ two or more different dihydric phenols or a combination of a dihydric phenol with a glycol.

The carbonate precursor can be either a carbonyl halide, a diarylcarbonate or a bishaloformate. The carbonyl halides include carbonyl bromide, carbonyl chloride, and mixtures thereof. The bishaloformates suitable for use include the bishaloformates of dihydric phenols such as bischloroformates of 2,2-bis(4-hydroxyphenyl)-propane, 2,2-bis(4-hydroxy-3,5-dichlorophenyl)propane, hydroquinone, and the like, or bishaloformates of glycols such as bishaloformates of ethylene glycol, and the like. While all of the above carbonate precursors are useful, carbonyl chloride, also known as phosgene, is preferred.

Also included within the scope of the present invention are the high molecular weight thermoplastic randomly branched polycarbonates. These randomly branched polycarbonates are prepared by coreacting a polyfunctional organic compound with the aforedescribed dihydric phenol and carbonate precursor. The polyfunctional organic compounds useful in making the branched chain polycarbonates are set forth in U.S. Pat. Nos. 3,635,895 and 4,001,184, which are incorporated herein by reference. These polyfunctional compounds are generally aromatic and contain at least three functional groups which are carboxyl, carboxylic anhydride, haloformyl or mixtures thereof. Some nonlimiting examples of these polyfunctional aromatic compounds include trimellitic anhydride, trimellitic acid, trimellityl trichloride. 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. Also included herein are blends of linear polycarbonates and branched chain polycarbonates.

The polycarbonate compositions of the instant invention are formulated by thoroughly admixing the stabilizing epoxy compound of the instant invention with the polycarbonate resin. The epoxy compound is selected from the group consisting of epoxy silanes, epoxy siloxanes, and mixtures thereof.

The epoxy silanes useful as hydrolytic stabilizers in the present invention are represented by the general formula

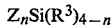   II.

wherein n is an integer having a value of from 1 to 3 inclusive. In Formula II $R^3$ is independently selected from hydrogen; alkyl radicals; substituted alkyl radicals; cycloalkyl radicals; alkenyl radicals; aryl radicals; aralkyl radicals; alkaryl radicals; divalent organic radicals which together with the Si atom form a cyclic structure, said organic radicals being selected from divalent saturated aliphatic hydrocarbon radicals and divalent saturated organic radicals containing carbon and oxygen atoms in the ring structure, with the proviso that if one of $R^3$ is such a divalent organic radical then n has a value of 1 or 2 and the total valence of silicon is four; $OR^4$ radicals wherein $R^4$ is selected from hydrogen, alkyl radicals, substituted alkyl radicals, alkenyl radicals, aryl radicals, aralkyl radicals, and alkaryl radicals; —$R^5OR^4$ radicals wherein $R^5$ is a divalent saturated aliphatic hydrocarbon radical or a divalent aromatic hydrocarbon radical; —$OOCR^4$ radicals; —$COOR^4$ radicals; —$R^5COOR^4$ radicals; —$R^5OOCR^4$ radicals; and polyether radicals of the formula —$R^6$+O—$R^7$)$_a$ O—$R^8$ wherein a is an integer having a value of from 1 to 4 inclusive, $R^6$ and $R^7$ are independently selected from divalent saturated aliphatic hydrocarbon radicals, and $R^8$ is an alkyl radical.

Preferably $R^3$ is selected from hydrogen; hydroxyl; alkyl radicals; alkoxy radicals; aryl radicals; aryloxy radicals; alkaryl radicals; and aralkyl radicals.

In Formula II preferred alkyl and substituted alkyl radicals represented by $R^3$ and $R^4$ are those containing from 1 to about 24 carbon atoms. Preferred cycloalkyl radicals represented by $R^3$ are those containing from 4 to about 24 carbon atoms. Preferred alkenyl radicals represented by $R^3$ and $R^4$ are those containing from 2 to about 24 carbon atoms. Preferred aryl radicals represented by $R^3$ and $R^4$ are those containing from 6 to 24 carbon atoms. Preferred alkaryl and aralkyl radicals represented by $R^3$ and $R^4$ are those containing from 7 to about 24 carbon atoms. Preferred divalent saturated aliphatic hydrocarbon radicals which together with the Si atom form a cyclic structure, as represented by $R^3$, are those containing from 2 to about 24 carbon atoms; which preferred divalent saturated organic radicals containing carbon and oxygen atoms in the ring structure are those containing from 2 to about 24 carbon atoms and from 1 to about 6 oxygen atoms. Preferred divalent saturated aliphatic hydrocarbon radicals represented by $R^5$, $R^6$ and $R^7$ are those containing from 1 to about 12 carbon atoms. Preferred alkyl radicals represented by $R^8$ are those containing from 1 to about 12 carbon atoms.

In Formula II Z represents a monovalent epoxy radical selected from the class consisting of monovalent derivatives of epoxy ethane and monovalent derivatives of epoxy cyclohexane. The monovalent derivatives of epoxy ethane are represented by the general formula

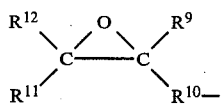   III.

wherein:

(i) $R^9$, $R^{10}$, $R^{11}$ and $R^{12}$ are independently selected from the class consisting of hydrogen; alkyl radicals; substituted alkyl radicals; cycloalkyl radicals, alkenyl radicals; aryl radicals; aralkyl radicals; alkaryl radicals; $OR^{13}$ radicals wherein $R^{13}$ is selected from the class consisting of hydrogen, alkyl radicals, substituted alkyl radicals, alkenyl radicals, aryl radicals, alkaryl radicals, and aralkyl radicals; —$R^{14}OR^{13}$ radicals wherein $R^{14}$ is a divalent saturated aliphatic hydrocarbon radical or a divalent aromatic hydrocarbon radical; —$OOCR^{13}$ radicals; —$COOR^{13}$ radicals; —$R^{14}OOCR^{13}$ radicals; —$R^{14}COOR^{13}$ radicals; —$OR^{15}$ radicals wherein $R^{15}$ is selected from the group consisting of oxirane ring containing monovalent saturated aliphatic hydrocarbon radicals and oxirane ring containing monovalent aliphatic-aromatic hydrocarbon radicals; —$R^{14}OR^{15}$ radicals; —$OOCR^{15}$ radicals; —$COOR^{15}$ radicals; —$R^{14}OOCR^{15}$ radicals; and —$R^{14}COOR^{15}$ radicals; with the proviso that (ii) one of $R^9$, $R^{10}$, $R^{11}$ or $R^{12}$ is selected from the class consisting of divalent saturated aliphatic hydrocarbon radicals; divalent aromatic hydrocarbon radicals; —$OR^{16}$— radicals wherein $R^{16}$ is a divalent saturated aliphatic hydrocarbon radical or a divalent aromatic hydrocarbon radical; —$R^{14}OR^{16}$— radicals; —$OOCR^{16}$— radicals; —$COOR^{16}$— radicals; —$R^{14}OOCR^{16}$— radicals; and —$R^{14}COOR^{16}$— radicals.

Preferred derivatives of epoxy ethane represented by Formula III are those wherein:

(i) $R^9$ through $R^{12}$ are independently selected from the class consisting of hydrogen; alkyl radicals; substituted alkyl radicals; cycloalkyl radicals; aryl radicals; aralkyl radicals; alkaryl radicals; and $OR^{17}$ radicals wherein $R^{17}$ is selected from the class consisting of hydrogen, alkyl radicals, substituted alkyl radicals, aryl radicals, alkaryl radicals, and aralkyl radicals; with the proviso that (ii) one of $R^9$, $R^{10}$, $R^{11}$ or $R^{12}$ is selected from the class consisting of divalent saturated aliphatic hydrocarbon radicals; divalent aromatic hydrocarbon radicals; $OR^{16}$— radicals; and —$R^{14}OR^{16}$— radicals.

While in Formula III $R^{10}$ is shown as falling within the definition of (ii) and being bonded to the silicon atom, this is merely done for the sake of convenience, clarity and illustration, and it is to be understood that any one of $R^9$ through $R^{12}$ can fall within the definition of (ii) and be bonded to the silicon atom.

In Formula III preferred alkyl and substituted alkyl radicals represented by $R^9$-$R^{13}$ and $R^{17}$ are those containing from 1 to about 24 carbon atoms. Preferred cycloalkyl radicals represented by $R^9$-$R^{12}$ are those containing from 4 to about 24 carbon atoms. Preferred alkenyl radicals represented by $R^9$-$R^{13}$ are those containing from 2 to about 24 carbon atoms. Preferred aryl radicals represented by $R^9$-$R^{13}$ and $R^{17}$ are those containing from 6 to 24 carbon atoms. Preferred alkaryl and aralkyl radicals represented by $R^9$-$R^{13}$ and $R^{17}$ are those containing from 7 to about 24 carbon atoms. Preferred divalent saturated aliphatic hydrocarbon radicals represented by $R^{14}$ and $R^{16}$ are those containing from 1 to about 12 carbon atoms. Preferred divalent aromatic hydrocarbon radicals represented by $R^{14}$ and $R^{16}$ are those containing from 6 to about 24 carbon atoms. Preferred oxirane ring containing monovalent saturated aliphatic hydrocarbon radicals represented by $R^{15}$ are those containing from 2 to about 24 carbon atoms, while preferred oxirane ring containing monovalent aliphatic-aromatic hydrocarbon radicals represented by $R^{15}$ are those containing from 8 to about 24 carbon atoms.

The derivatives of epoxy cyclohexane are represented by the general formula

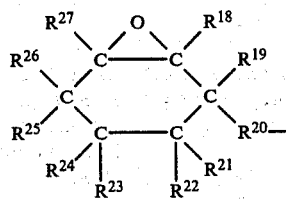

IV.

wherein:

(a) $R^{18}$ through $R^{27}$ are independently selected from hydrogen; alkyl radicals; substituted alkyl radicals; alkenyl radicals; aryl radicals; aralkyl radicals; alkaryl radicals; $OR^{29}$ radicals wherein $R^{29}$ is selected from the class consisting of hydrogen, alkyl radicals, substituted alkyl radicals, alkenyl radicals, aryl radicals, alkaryl radicals, and aralkyl radicals; —$R^{30}OR^{29}$ radicals wherein $R^{30}$ is selected from the class consisting of divalent saturated aliphatic hydrocarbon radicals and divalent aromatic hydrocarbon radicals; —$COOR^{29}$ radicals; —$OOCR^{29}$ radicals; —$R^{30}COOR^{29}$ radicals; —$R^{30}OOCR^{29}$ radicals; $OR^{31}$ radicals wherein $R^{31}$ is selected from oxirane ring containing saturated aliphatic hydrocarbon radicals and oxirane ring containing aliphatic-aromatic hydrocarbon radicals; —$R^3OR^{31}$ radicals; —$OOCR^{31}$ radicals; —$COOR^{31}$ radicals; —$R^{30}OOCR^{31}$ radicals; and —$R^{30}COOR^{31}$ radicals; with the proviso that (b) one of $R^{18}$ through $R^{27}$ is selected from the class consisting of divalent saturated aliphatic hydrocarbon radicals; divalent aromatic hydrocarbon radicals; —$OR^{32}$— radicals wherein $R^{32}$ is selected from the class consisting of divalent saturated aliphatic hydrocarbon radicals and divalent aromatic hydrocarbon radicals; —$R^{30}OR^{32}$— radicals; —$OOCR^{32}$— radicals; —$COOR^{32}$— radicals; —$R^{30}OOCR^{32}$— radicals; and —$R^{30}COOR^{32}$— radicals.

Preferred derivatives of epoxycyclohexane represented by Formula IV are those wherein:

(a) $R^{18}$ through $R^{27}$ are independently selected from the class consisting of hydrogen; alkyl radicals; substituted alkyl radicals; aryl radicals; alkaryl radicals; aralkyl radicals; and $OR^{28}$ radicals wherein $R^{28}$ is selected from hydrogen, alkyl radicals, substituted alkyl radicals, aryl radicals, alkaryl radicals, and aralkyl radicals; with the proviso that (b) one of $R^{18}$ through $R^{27}$ is selected from the class consisting of divalent saturated aliphatic hydrocarbon radicals; divalent aromatic hydrocarbon radicals; —$OR^{32}$— radicals; and —$R^{30}OR^{32}$— radicals.

While in Formula IV $R^{21}$ is shown as falling within the definition of (b) and being bonded to the silicon atom this is merely done for the sake of convenience, clarity and illustration, and it is to be understood that any one of $R^{18}$ through $R^{27}$ can fall within the definition of (b) and be bonded to the silicon atom.

In Formula IV preferred alkyl radicals represented by $R^{18}$ through $R^{27}$, $R^{28}$ and $R^{29}$ are those containing from 1 to about 24 carbon atoms. Preferred substituted alkyl radicals represented by $R^{18}$-$R^{27}$, $R^{28}$ and $R^{29}$ are those containing from 1 to about 24 carbon atoms. Preferred alkenyl radicals represented by $R^{18}$-$R^{27}$ and $R^{29}$ are those containing from 2 to about 24 carbon atoms. Preferred aryl radicals represented by $R^{18}$-$R^{27}$, $R^{28}$ and $R^{29}$ are those containing from 6 to 24 carbon atoms. Preferred aralkyl radicals represented by $R^{18}$-$R^{27}$, $R^{28}$ and $R^{29}$ are those containing from 7 to about 24 carbon atoms. Preferred alkaryl radicals represented by $R^{18}$-$R^{27}$, $R^{28}$ and $R^{29}$ are those containing from 7 to about 24 carbon atoms. Preferred divalent saturated aliphatic hydrocarbon radicals represented by $R^{30}$ and $R^{32}$ are those containing from 1 to about 12 carbon atoms. Preferred divalent aromatic hydrocarbon radicals represented by $R^{30}$ and $R^{32}$ are those containing from 6 to 24 carbon atoms. Preferred oxirane ring containing saturated aliphatic hydrocarbon radicals represented by $R^{31}$ are those containing from 2 to about 24 carbon atoms. Preferred oxirane ring containing aliphatic-aromatic hydrocarbon radicals represented by $R^{31}$ are those containing from 8 to about 24 carbon atoms.

Substituted alkyl radicals are preferably those radicals containing one or more inorganic substituent groups such as hydroxyl and/or halides (chlorine, fluorine, bromine and iodine).

Some nonlimiting illustrative examples of divalent organic radicals containing carbon and oxygen atoms in the ring structure which together with the silicon atom form a cyclic structure represented by $R^3$ in Formula II include —$CH_2$—O—$CH_2$—, —$C_2H_4$—O—$C_2H_4$—O—$C_2H_4$—, —O—$C_2H_4$—, —O—$C_3H_6$—O—, —$CH_2$—O—$C_4H_8$—O—$CH_2$—, and the like. Preferably these compounds are the saturated aliphatic organic compounds containing from 2 to about 24 carbon atoms and from 1 to about 6 oxygen atoms.

Some nonlimiting illustrative examples of divalent saturated aliphatic hydrocarbon radicals represented by $R^5$, $R^{14}$, $R^{16}$, $R^{30}$ and $R^{32}$ include —$CH_2CH_2$—,

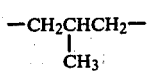

—$CH_2CH_2CH_2CH_2$—, and the like.

Some nonlimiting illustrative examples of divalent aromatic hydrocarbon radicals represented by $R^5$, $R^{14}$, $R^{16}$, $R^{30}$ and $R^{32}$ include

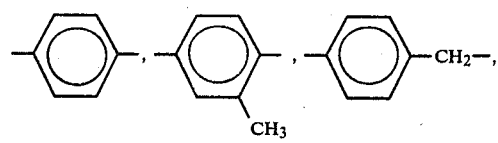

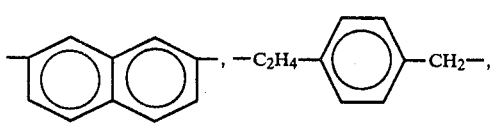

and the like.

Some nonlimiting illustrative examples of oxirane ring containing monovalent saturated aliphatic hydrocarbon radicals represented by $R^{15}$ and $R^{31}$ include

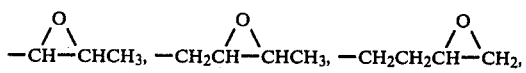

and the like.

Some nonlimiting illustrative examples of oxirane ring containing aliphatic-aromatic radicals represented by $R^{15}$ and $R^{31}$ include:

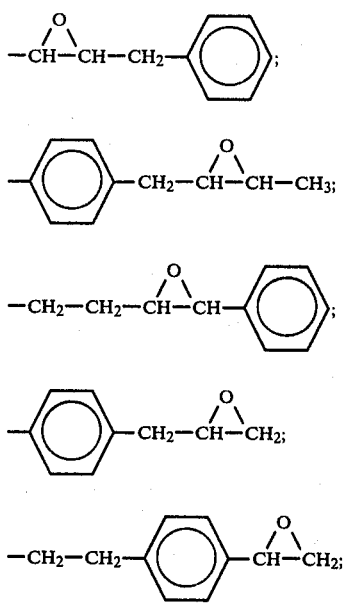

When Z in Formula II represents a monovalent derivative of epoxy ethane as represented by Formula III, Formula II becomes

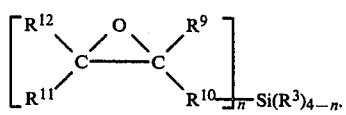

V.

When Z in Formula II represents a monovalent derivative of epoxy cyclohexane as represented by Formula IV, Formula II becomes

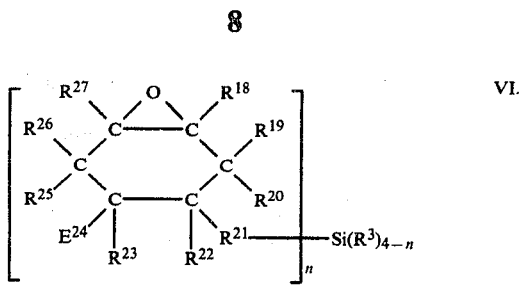

VI.

While in Formula V $R^{10}$ is depicted as being bonded to the silicon atom it is to be understood that bonding to the silicon atom can occur through any one of $R^9$–$R^{12}$. So also in Formula VI where $R^{21}$ is depicted as being bonded to the silicon atom, it is to be understood that bonding can occur through any one of $R^{18}$–$R^{27}$.

The epoxy silanes of Formulae V and VI are compounds well known to those skilled in the art and are generally commercially available, or can be prepared by known methods.

Some nonlimiting illustrative examples of compounds represented by Formulae V and VI, as well as epoxy siloxanes of Formula VII, are set forth in Table I.

The epoxy siloxane compounds useful as stabilizers in the polycarbonate compositions of the instant invention are represented by the general formula

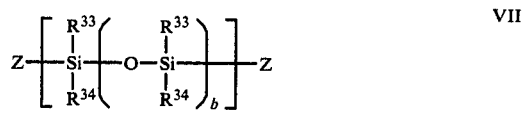

VII wherein b is an integer having a value from 1 to about 10; $R^{33}$ and $R^{34}$ are independently selected from alkyl radicals of from 1 to about 24 carbon atoms, alkenyl radicals of from 2 to about 24 carbon atoms, alkoxy radicals of from 1 to about 24 carbon atoms, aryl radicals of from 6 to 24 carbon atoms, aryloxy radicals of from 6 to 24 carbon atoms, aralkyl radicals of from 7 to about 24 carbon atoms, alkaryl radicals of from 7 to about 24 carbon atoms, and hydrogen; and each Z is independently selected from the monovalent epoxy radicals represented by Formulae III and IV.

In Formula VII both Zs can be the same or they may be different. Thus, for example, one Z may be an epoxy radical represented by Formula III while the other Z may be an epoxy radical represented by Formula IV; one Z may be an epoxy radical represented by Formula III while the second Z is a different epoxy radical represented by Formula III; or one Z may be one epoxy radical represented by Formula IV while the other Z is a different epoxy radical represented by Formula IV.

TABLE I beta-(3,4-epoxycyclohexyl)ethyl-trimethoxy silane;
2,2,3,3,4,4-hexamethyl-5,6-epoxycyclohexylmethyl trivinylsilane;
1-(beta-3,4-epoxycyclohexyl)ethyl-1-methyl-1-sila-2-oxacyclohexane;
gamma-(glycidoxypropyl)trimethoxy silane;
gamma-(glycidoxypropyl)ethoxy silane;
p-glycidoxyphenyl-dicyclohexyl acetoxy silane;
bis(3-glycidoxypropyl)tetramethyl disiloxane;
1,8-di(beta-3,4-epoxycyclohexyl)ethyl-octadiphenyl-siloxane; and
1,3-di(2,3-epoxypropane)hexaethoxy trisiloxane.

The polycarbonate compositions of the instant invention may contain only one of the aforedescribed epoxy hydrolytic stabilizers or they may contain a mixture of two or more of these stabilizers. Thus, for example, the polycarbonate compositions of the instant invention may contain two different epoxy stabilizers of Formula V; two different stabilizers of Formula VI; two different stabilizers of Formula VII; one epoxy stabilizer of Formula VI and one epoxy stabilizer of Formula V; one epoxy stabilizer of Formula V and one epoxy stabilizer of Formula VII; or one epoxy stabilizer of Formula VI and one epoxy stabilizer of Formula VII.

The amount of the epoxy stabilizer present in the polycarbonate compositions of the instant invention is a stabilizing amount. By stabilizing amount is meant an amount of stabilizer effective to stabilize the polycarbonate resin composition against hydrolytic degradation. Generally, this amount is from about 0.005 to about 4.0 weight percent based on the weight of the polycarbonate resin. Preferably this amount ranges from about 0.01 to about 2 weight percent, and more preferably from about 0.02 to about 0.5 weight percent.

The polycarbonate resin compositions are formulated by adding the epoxy compounds of the present invention to the polycarbonate resin and mixing or blending by generally mechanical means such as stirring, shaking, blending in a mechanical blender, and the like to form the compositions of the instant invention.

The compositions of the instant invention may optionally contain other commonly known and used additives such as antistatic agents, antioxidants, ultraviolet radiation absorbers, mold release agents, colorants, fillers such as glass fibers, graphite fibers, etc, impact modifiers, color stabilizers, flame retardants, and the like. Some nonlimiting illustrative examples of suitable ultraviolet radiation abosrbers include the benzophenones and the benzotriazoles. Some nonlimiting illustrative examples of suitable color stabilizers include the organophosphites. Some of these organophosphites are disclosed in U.S. Pat. Nos. 4,138,379; 4,118,370 and 3,305,520, all of which are incorporated herein by reference. Some useful flame retardants are those disclosed in U.S. Pat. Nos. 3,915,926; 4,197,232 and the organic alkali metal salts and organic alkaline earth metal salts of sulfonic acid as described in U.S. Pat. Nos. 3,933,734; 3,948,851; 3,926,968; 3,919,167; 3,909,490; 3,953,396; 3,931,100; 3,978,024; 3,953,399; 3,917,559; 3,951,910 and 3,940,366, all of which are incorporated herein by reference.

As mentioned earlier the compositions of the instant invention may contain color stabilizers. The preferred color stabilizers are the organophosphites. These organophosphites and their color stabilizing properties are well known to those skilled in the art and are disclosed, for example, in U.S. Pat. Nos. 3,305,520; 4,138,379; 4,118,370 and 4,102,859, the disclosure of which are incorporated herein by reference. Generally, without the presence of these organophosphite color stabilizers the color of the aromatic polycarbonate molded articles tends to deteriorate when exposed to high temperatures such as those existant during processing or in applications associated with high temperature environments. Sometimes this color deterioration is so severe that these aromatic polycarbonate articles become commercially unacceptable. The addition of the organophosphite color stabilizers to the polycarbonate resins generally remedies this problem of color deterioration. However, these organophosphite color stabilizers generally tend to adversely affect the hydrolytic stability of the aromatic polycarbonate resin. Thus, in the case where organophosphite color stabilizers are present in the aromatic polycarbonate composition it is even more necessary to stabilize these compositions against hydrolytic degradation than in the case of aromatic polycarbonate resin compositions containing no organophosphite color stabilizers.

DESCRIPTION OF THE PREFERRED EMBODIMENT

The following examples are set forth to further illustrate the present invention and are not to be construed as limiting the invention thereto. Unless otherwise specified, where parts or percents are mentioned, they are parts or percents by weight.

EXAMPLE 1

This example illustrates a control composition which is comprised of an aromatic polycarbonate resin and which does not contain the hydrolytic stabilizers of the instant invention.

To a reactor vessel are charged 5.5 liters of deionized water, 7.0 liters of methylene chloride, 2,280 grams (10 moles) of bisphenol A, 14 milliliters of triethylamine, 3.4 grams of sodium gluconate, and 34.8 grams (0.37 mole) of phenol. Phosgene is introduced at the rate of 36 grams/minute and phosgenation is continued for 30 minutes. The pH is maintained at between 9.5 and 11.0 by the addition of 25% aqueous sodium hydroxide. After phosgenation has ceased 7 liters of methylene chloride are added, the brine layer is separated by centrifuge and the resin solution is washed with aqueous acid and water. The resin is steam precipitated and dried. This resin product is then fed to an extruder operating at a temperature of about 500° F. to extrude the resin into strands and the extruded strands are chopped into pellets. The pellets are then injection molded at about 570° F. into test samples measuring about $3'' \times 2'' \times 0.1''$.

EXAMPLE 2

This example illustrates a color stabilized aromatic polycarbonate composition which does not contain the hydrolytic stabilizers of the instant invention and thus falls outside the scope of the instant invention.

To the powdered aromatic polycarbonate resin prepared substantially in accordance with the procedure of Example 1 is added 0.03 parts by weight per hundred parts by weight of resin of a color stabilizer package containing a major amount of bis(2,4-ditertiarybutylphenyl)pentaerythritol diphosphite color stabilizer. The resin and color stabilizer are thoroughly mixed and the mixture is fed to an extruder operating at a temperature of about 500° F. to extrude the resin into strands and the extruded strands are chopped into pellets. The pellets are then injection molded at about 570° F. into test samples measuring about $3'' \times 2'' \times 0.1''$.

EXAMPLE 3

This example illustrates a hydrolytically stabilized aromatic polycarbonate composition of the present invention.

To the powdered aromatic polycarbonate resin prepared substantially in accordance with the procedure of Example 1 are added 0.1 parts by weight of gamma(glycidoxypropyl)trimethoxysilane per hundred parts by weight of resin. The resin and stabilizer are thoroughly mixed and the mixture is then fed to an extruder operating at a temperature of about 500° F. to extrude the mixture into strands and the strands are chopped into pellets. The pellets are then injection molded at about 570° F. into test samples measuring about 3"×2"×0.1".

EXAMPLE 4

This example illustrates a stabilized aromatic polycarbonate composition of the instant invention.

To the powdered aromatic polycarbonate resin prepared substantially in accordance with the procedure of Example 1 are added 0.2 parts by weight of gamma(glycidoxypropyl)trimethoxysilane per hundred parts of resin. The resin and the stabilizer are thoroughly mixed and the mixture is fed into an extruder operating at a temperature of about 500° F. to extrude the mixture into strands and the strands are chopped into pellets. The pellets are then injection molded at about 570° F. into test samples measuring about 3"×2"×0.1".

EXAMPLE 5

This example illustrates another stabilized aromatic polycarbonate composition of the instant invention.

To the powdered polycarbonate resin prepared substantially in accordance with the procedure of Example 1 are added 0.11 parts by weight of beta(3,4-epoxycyclohexyl)ethyltrimethoxy silane per hundred parts of resin. The resin and the stabilizer are thoroughly mixed and the mixture is then fed into an extruder operating at a temperature of about 500° F. to extrude the mixture into strands and the extruded strands are chopped into pellets. The pellets are then injection molded at about 570° F. into test samples measuring about 3"×2"×0.1".

EXAMPLE 6

This example illustrates a stabilized aromatic polycarbonate composition of the instant invention.

To the powdered polycarbonate resin prepared substantially in accordance with the procedure of Example 1 are added 0.22 parts by weight of beta(3,4-epoxycyclohexyl) ethyltrimethoxy silane per hundred parts of resin. The resin and the stabilizer are thoroughly mixed and the mixture is fed into an extruder operating at a temperature of about 500° F. to extrude the mixture into into strands and the extruded strands are chopped into pellets. The pellets are then injection molded at about 570° F. into test samples measuring about 3"×2"×0.1".

EXAMPLE 7

This example illustrates yet another stabilized aromatic polycarbonate composition of the instant invention.

To the powdered aromatic polycarbonate resin prepared substantially in accordance with the procedure of Example 1 there are added 0.08 parts by weight of bis(3-glycidoxypropyl)tetramethyldisiloxane per hundred parts of resin. The resin and the stabilizer are thoroughly mixed and the mixture is fed into an extruder operating at a temperature of about 500° F. to extrude the mixture into strands and the extruded strands are chopped into pellets. The pellets are then injection molded at about 570° F. into test samples measuring about 3"×2"×0.1".

EXAMPLE 8

This example illustrates another stabilized aromatic polycarbonate composition of the instant invention.

To the powdered aromatic polycarbonate resin prepared substantially in accordance with the procedure of Example 1 there are added 0.16 parts by weight of bis(3-glycidoxypropyl)tetramethyldisiloxane per hundred parts of resin. The resin and the stabilizer are thoroughly mixed and the mixture is fed into an extruder operating at a temperature of about 500° F. to extrude the mixture into strands and the strands are chopped into pellets. The pellets are then injection molded into test samples at about 570° F. measuring about 3"×2"×0.1".

EXAMPLE 9

This example illustrates a color and hydrolytically stabilized aromatic polycarbonate composition falling within the scope of the instant invention.

To a color stabilized aromatic polycarbonate resin mixture prepared substantially in accordance with the procedure of Example 2 are added 0.1 parts by weight of gamma(glycidoxypropyl)trimethoxysilane per hundred parts of resin. The resin and the stabilizer are thoroughly mixed and the mixture is fed to an extruder operating at a temperature of about 500° F. to extrude the mixture into strands and the strands are chopped into pellets. The pellets are then injection molded into test samples at about 570° F. The test sample measure about 3"×2"×0.1".

EXAMPLE 10

This example illustrates another color and hydrolytically stabilized aromatic polycarbonate composition of the instant invention.

To a color stabilized aromatic polycarbonate resin mixture prepared substantially in accordance with the procedure of Example 2 there are added 0.2 parts by weight of gamma(glycidoxypropyl)trimethoxysilane per hundred parts of resin. The resin and the stabilizer are thoroughly mixed and the mixture is fed to an extruder operating at a temperature of about 500° F. to extrude the mixture into strands and the strands are chopped into pellets. The pellets are then injection molded at about 570° F. into test samples measuring about 3"×2"×0.1".

EXAMPLE 11

This example illustrates yet another color and hydrolytically stabilized aromatic polycarbonate composition of the present invention.

To a color stabilized aromatic polycarbonate mixture prepared substantially in accordance with the procedure of Example 2 there are added 0.11 parts by weight of beta(3,4-epoxycyclohexyl)ethyltrimethoxysilane per hundred parts of resin. The resin and the stabilizer are thoroughly mixed and the resultant mixture is fed into an extruder operating at a temperature of about 500° F. to extrude the mixture into strands and the extruded strands are chopped into pellets. The pellets are then injection molded at about 570° F. into test samples measuring about 3"×2"×0.1".

EXAMPLE 12

This example illustrates another color and hydrolytically stabilized aromatic polycarbonate composition of the instant invention.

To a color stabilized aromatic polycarbonate resin mixture prepared substantially in accordance with the procedure of Example 2 there are added 0.22 parts by weight of beta(3,4-epoxycyclohexyl)ethyltrimethoxysilane per hundred parts of resin. The resin and the stabilizer are thoroughly mixed and the resultant mixture is fed into an extruder operating at a temperature of about 500° F. to extrude the mixture into strands and the extruded strands are chopped into pellets. The pellets are then injection molded at about 570° F. into test samples measuring about 3"×2"×0.1".

EXAMPLE 13

This example illustrates yet another color and hydrolytically stabilized aromatic polycarbonate composition of the instant invention.

To a color stabilized aromatic polycarbonate resin mixture prepared substantially in accordance with the procedure of Example 2 there are added 0.08 parts by weight of bis(3-glycidoxypropyl)tetramethyldisiloxane per hundred parts of resin. The resin and the stabilizer are thoroughly mixed and the mixture is fed into an extruder operating at a temperature of about 500° F. to extrude the mixture into strands and the strands are chopper into pellets. The pellets are then injection molded at about 570° F. into test samples measuring about 3"×2"×0.1".

EXAMPLE 14

This example illustrates still another color and hydrolytically stabilized aromatic polycarbonate composition of the instant invention.

To a color stabilized aromatic polycarbonate resin mixture prepared substantially in accordance with the procedure of Example 2 there are added 0.16 parts by weight of bis(3-glycidoxypropyl)tetramethyldisiloxane per hundred parts of resin. The resin and stabilizer are thoroughly mixed and the resultant mixture is fed into an extruder operating at a temperature of about 500° F. to extrude the mixture into strands and the extruded strands are chopped into pellets. The pellets are then injection molded into test samples measuring about 3"×2"×0.1".

Each of the samples prepared in accordance with the procedures of Examples 1–14 are subjected to ASTM Yellowness Index Test D 1925. Each of these samples are also subjected to ASTM test method D 1003 for determining light transmission. The samples are subjected to this test before autoclaving and after autoclaving at 250° F. In this test, the higher the percent light transmitted, the better the clarity of the sample and, thus, the lower the degradation of the sample by hydrolysis. Conversely, the lower the percent of light transmitted, the lesser the clarity of the sample and, thus, the greater the degree of hydrolytic degradation of the sample. The results of these tests are set forth in Table II.

Each of the test samples prepared in Examples 1–14 is further measured for molecular weight degradation caused by hydrolytic degradation. This is done by measuring the intrinsic viscosity both before and after steam autoclaving. The difference in the viscosity of the sample before and after autoclaving indicates the degree of hydrolytic degradation undergone by the sample. The greater the difference or change in intrinsic viscosity the greater the degradation of the sample by hydrolysis. The lesser the change in the intrinsic viscosity of the sample the lesser the hydrolytic degradation of the sample. The results of this test are set forth in Table III.

TABLE II

| Example No. | YI | % Light Transmitted Before Autoclaving | % Light Transmitted After Autoclaving (Time in Hours) 72 | 144 |
|---|---|---|---|---|
| 1 | 6.3 | 86.7 | 72.9 | 66.8 |
| 2 | 3.6 | 88.8 | 13.2 | 5.6 |
| 3 | 4.5 | 88.8 | 80.5 | 69 |
| 4 | 4.3 | 89 | 75.1 | 62 |
| 5 | 4.5 | 88.8 | 83.5 | 80.5 |
| 6 | 4.4 | 88.9 | 77.7 | 72.4 |
| 7 | 4.6 | 88.7 | 79.7 | 74.5 |
| 8 | 4.6 | 88.8 | 77.8 | 73.4 |
| 9 | 3.5 | 88.8 | 32.4 | 7.0 |
| 10 | 3.8 | 88.6 | 29.9 | 7.5 |
| 11 | 3.4 | 89.1 | 67.3 | 27.9 |
| 12 | 3.5 | 89.0 | 69.9 | 54.0 |
| 13 | 3.2 | 89.3 | 19.6 | 6.0 |
| 14 | 3.3 | 89.2 | 49.4 | 7.0 |

TABLE III

| Example No. | Intrinsic Viscosity Before Autoclaving | Intrinsic Viscosity After Autoclaving (Time in Hours) 72 | 144 |
|---|---|---|---|
| 1 | 0.482 | 0.454 | 0.444 |
| 2 | 0.491 | 0.388 | 0.351 |
| 3 | 0.481 | 0.467 | 0.474 |
| 4 | 0.482 | 0.466 | 0.453 |
| 5 | 0.482 | 0.469 | 0.457 |
| 6 | 0.482 | 0.468 | 0.458 |
| 7 | 0.479 | 0.465 | 0.451 |
| 8 | 0.480 | 0.460 | 0.446 |
| 9 | 0.482 | 0.414 | 0.376 |
| 10 | 0.483 | 0.416 | 0.383 |
| 11 | 0.485 | 0.453 | 0.417 |
| 12 | 0.484 | 0.466 | 0.445 |
| 13 | 0.485 | 0.391 | 0.348 |
| 14 | 0.485 | 0.417 | 0.352 |

The data in Tables II and III clearly illustrate the effect that autoclaving has on the aromatic polycarbonate test samples with and without the particular epoxy stabilizers of the instant invention. It is clear from this data that the test samples molded from aromatic polycarbonate compositions containing the particular epoxy stabilizers of the instant invention, i.e., Examples 3–14, are hydrolytically more stable than the test samples molded from aromatic polycarbonate resin containing no hydrolytic stabilizers, i.e., Examples 1 and 2. This difference in hydrolytic stability is particularly evident when organophosphite color stabilizers are used with the aromatic polycarbonate resin, i.e., Examples 2 and 9–14.

In addition to improving the hydrolytic stability of polycarbonate resin compositions, the instant stabilizers also generally improve the color of polycarbonate resin compositions, as illustrated by the data in Table II.

It will thus be seen that the objects set forth above among those made apparent from the preceding description are effeciently attained. Since certain changes may be made in the processes and compositions described herein without departing from the scope of the invention, it is intended that all matters contained in the above description shall be interperted as illustrative rather than limiting.

What is claimed is:

1. An aromatic polycarbonate composition exhibiting improved hydrolytic stability comprising in admixture an endcapped aromatic polycarbonate resin and a hydrolytically stabilizing amount of at least one stabilizing compound of the formula

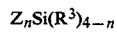

wherein
n is an integer from 1 to 3 inclusive;
$R^3$ is independently selected from hydrogen, alkyl radicals; substituted alkyl radicals; alkenyl radicals; cycloalkyl radicals; aryl radicals; alkaryl radicals; aralkyl radicals; divalent organic radicals which together with the silicon atom form a cyclic structure, said organic radicals being selected from divalent saturated aliphatic hydrocarbon radicals and divalent saturated aliphatic organic radicals containing carbon and oxygen atoms in the ring structure; $OR^4$ radicals wherein $R^4$ is selected from hydrogen, alkyl radicals, substituted alkyl radicals, alkenyl radicals, aryl radicals, aralkyl radicals, alkaryl radicals, cycloalkyl radicals; —$R^5OR^4$ radicals wherein $R^5$ is a divalent saturated aliphatic hydrocarbon radical or a divalent aromatic hydrocarbon radical; —$COOR^4$ radicals; —$OOCR^4$ radicals; —$R^5COOR^4$ radicals; —$R^5OOCR^4$ radicals; and polyether radicals.
Z is of the formula

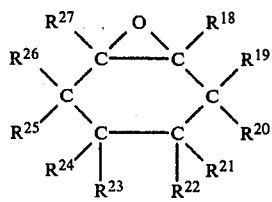

wherein:
(i) $R^{18}$ through $R^{27}$ are independently selected from the class consisting of hydrogen; alkyl radicals; substituted alkyl radicals; alkenyl radicals; aryl radicals; alkaryl radicals; aralkyl radicals; $OR^{29}$ radicals wherein $R^{29}$ is selected from the class consisting of hydrogen, alkyl radicals, substituted alkyl radicals, alkenyl radicals, aryl radicals, alkaryl radicals, and aralkyl radicals; —$R^{30}OR^{29}$ radicals wherein $R^{30}$ is a divalent saturated aliphatic hydrocarbon radical or a divalent aromatic hydrocarbon radical; —$COOR^{29}$ radicals; —$OOCR^{29}$ radicals; —$R^{30}OOCR^{29}$ radicals; —$R^{30}COOR^{29}$ radicals; $OR^{31}$ radicals wherein $R^{31}$ is selected from the class consisting of oxirane ring containing saturated aliphatic hydrocarbon radicals and oxirane ring containing aliphatic-aromatic hydrocarbon radicals; —$R^{30}OOCR^{31}$ radicals; and —$R^{30}COOR^{31}$ radicals; with the proviso that
(ii) one of $R^{18}$ through $R^{27}$ is selected from the class consisting of divalent saturated aliphatic hydrocarbon radicals; divalent aromatic hydrocarbon radicals; 13 $OR^{32}$— radicals wherein $R^{32}$ is selected from divalent saturated aliphatic hydrocarbon radicals and divalent aromatic hydrocarbon radicals; —$R^{30}OR^{32}$— radicals; —$OOCR^{32}$— radicals; —$COOR^{32}$— radicals; —$R^{3}OOOCR^{32}$— radicals; and —$R^{30}COOR^{32}$— radicals.

2. The composition of claim 1 wherein said stabilizing amount is from about 0.005 to about 4 weight percent based on the weight of the aromatic polycarbonate resin.

3. The composition of claim 2 wherein:
(i) $R^{18}$ through $R^{27}$ are independently selected from the class consisting of hydrogen; alkyl radicals; substituted alkyl radicals; cycloalkyl radicals; aryl radicals; alkaryl radicals; aralkyl radicals; and $OR^{28}$ radicals wherein $R^{28}$ is selected from hydrogen, alkyl radicals, substituted alkyl radicals, aryl radicals, alkaryl radicals, and aralkyl radicals; with the proviso that
(ii) one of $R^{18}$ through $R^{27}$ is selected from the class consisting of divalent saturated aliphatic hydrocarbon radicals; divalent aromatic hydrocarbon radicals; —$OR^{32}$— radicals; and —$R^{30}OR^{32}$— radicals.

4. The composition of claim 3 wherein $R^3$ is selected from hydrogen, hydroxyl, alkyl radicals, alkoxy radicals, aryl radicals, aryloxy radicals, alkaryl radical, and aralkyl radicals.

5. The composition of claim 4 wherein said aromatic polycarbonate is derived from a dihydric phenol and a carbonate precursor.

6. The composition of claim 5 wherein said carbonate precursor is phosgene.

7. The composition of claim 6 wherein said dihydric phenol is bisphenol A.

8. The composition of claim 4 which further includes an organophosphite color stabilizer.

9. The composition of claim 8 wherein said aromatic polycarbonate is derived from a dihydric phenol and a carbonate precursor.

10. The composition of claim 9 wherein said carbonate precursor is phosgene.

11. The composition of clam 10 wherein said dihydric phenol is bisphenol A.

12. The composition of claim 4 wherein $R^3$ is $CH_3O$—; n is 1; $R^{18}$–$R^{21}$ and $R^{23}$–$R^{27}$ are hydrogen; and $R^{22}$ is —$CH_2CH_2$—.

* * * * *

UNITED STATES PATENT AND TRADEMARK OFFICE
CERTIFICATE OF CORRECTION

PATENT NO. : 4,393,158
DATED : July 12, 1983
INVENTOR(S) : Kenneth F. Miller

It is certified that error appears in the above-identified patent and that said Letters Patent are hereby corrected as shown below:

In the claims - column 16, line 6

"radicals; 13 $OR^{32}$-radicals wherein $R^{32}$ is se-"

should be

"radicals; $OR^{32}$-radicals wherein $R^{32}$ is se-"

Column 16, line 53

"$R^{22}$ is $-CH_2CH_2-$."

should be

"$R^{22}$ is $\beta-CH_2CH_2-$."

Signed and Sealed this

Twenty-fifth Day of June 1985

[SEAL]

Attest:

DONALD J. QUIGG

Attesting Officer     Acting Commissioner of Patents and Trademarks